United States Patent
Attimont et al.

[11] Patent Number: 6,114,831
[45] Date of Patent: Sep. 5, 2000

[54] PORTABLE ELECTRONIC APPARATUS WITH A CIRCUIT FOR CONTROLLING DISCHARGING OF A BATTERY, AND A METHOD ASSOCIATED WITH SAID CIRCUIT

[75] Inventors: Luc Attimont, Le Port Marly; Jannick Bodin, Garches, both of France

[73] Assignee: Alcatel, Paris, France

[21] Appl. No.: 09/397,962

[22] Filed: Sep. 17, 1999

[30] Foreign Application Priority Data

Sep. 28, 1998 [FR] France ................................. 98 12 071

[51] Int. Cl.$^7$ ........................................... H02J 7/00
[52] U.S. Cl. ................................................. 320/106
[58] Field of Search ............................. 320/106, 122, 320/134, 136, 141, 161

[56] References Cited

U.S. PATENT DOCUMENTS

| | | | |
|---|---|---|---|
| 5,164,652 | 11/1992 | Johnson et al. | 320/106 |
| 5,350,993 | 9/1994 | Toya et al. | 320/106 |
| 5,432,429 | 7/1995 | Armstrong, II et al. | 320/141 |
| 5,477,124 | 12/1995 | Tamai | 320/134 |
| 5,668,465 | 9/1997 | May . | |
| 5,705,913 | 1/1998 | Takeuchi et al. | 320/136 |
| 5,739,671 | 4/1998 | Hamada | 320/149 |
| 5,789,903 | 8/1998 | Young et al. | 320/161 |
| 5,894,212 | 4/1999 | Balogh | 320/122 |
| 5,907,238 | 5/1999 | Owerko et al. | 320/136 |
| 5,929,603 | 7/1999 | Nakao et al. | 320/136 |
| 5,959,436 | 9/1999 | Takashina et al. | 320/134 |
| 5,990,663 | 11/1999 | Mukainakano | 320/134 |
| 5,990,664 | 11/1999 | Rahman | 320/136 |
| 6,014,008 | 1/2000 | Hartzell et al. | 320/106 |

FOREIGN PATENT DOCUMENTS 0 394 074 A2  10/1990  European Pat. Off. .
WO 98/36483  8/1998  WIPO .

*Primary Examiner*—Peter S. Wong
*Assistant Examiner*—Pia Tibbits
*Attorney, Agent, or Firm*—Sughrue, Mion, Zinn, Macpeak & Seas, PLLC

[57] ABSTRACT

A portable electronic apparatus suitable for being electrically powered by various types of batteries includes a circuit which identifies the type of battery that is connected to it, and a discharge control circuit which controls discharging of the battery, the discharge control circuit including a comparator circuit which compares the output voltage of the battery with a minimum threshold voltage, a current-determining circuit which determines a value representative of the output current of the battery, an adapter circuit which adapts the minimum threshold voltage as a function of the identified battery type and of the value representative of the output current; a disconnect/stop circuit which stops the electronic apparatus from being powered when the output voltage of the battery becomes lower than the minimum threshold voltage delivered by the adapter circuit.

9 Claims, 2 Drawing Sheets

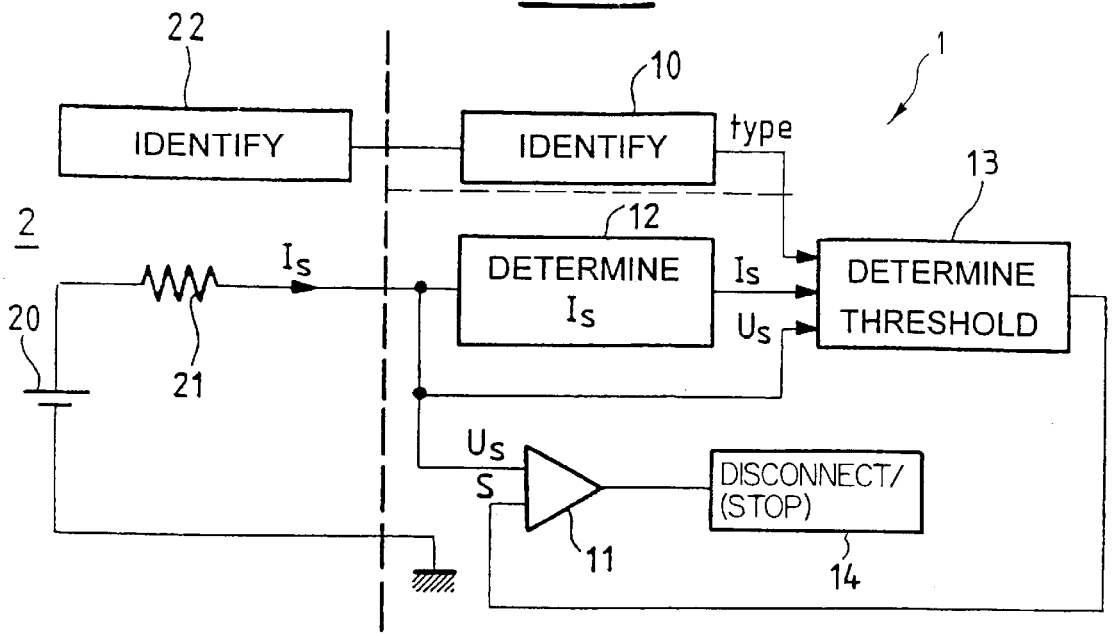
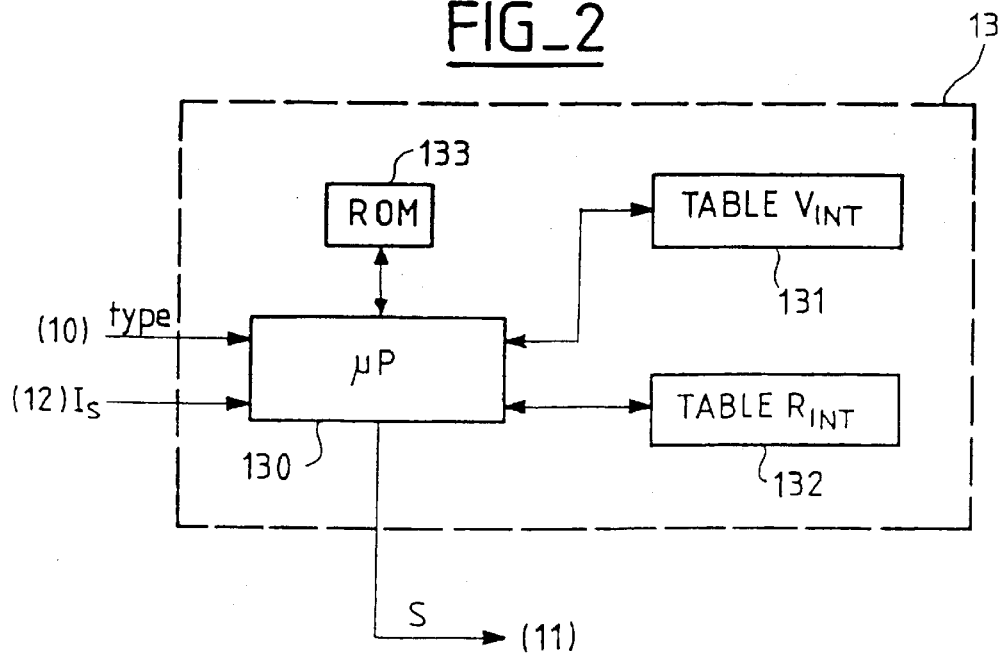

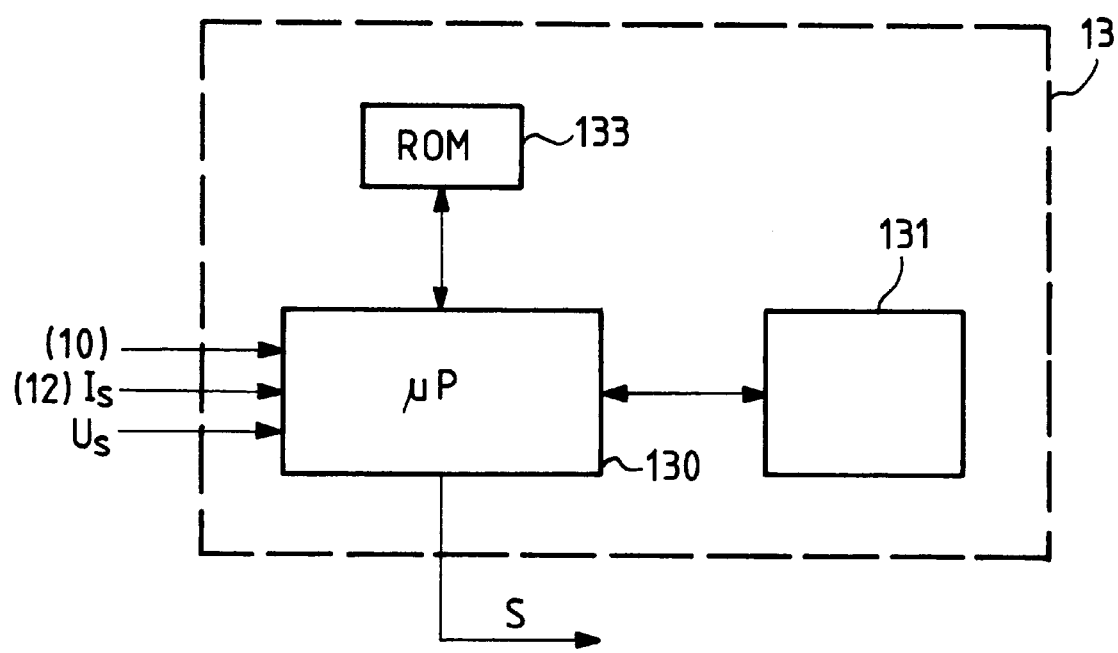
FIG_3

PORTABLE ELECTRONIC APPARATUS WITH A CIRCUIT FOR CONTROLLING DISCHARGING OF A BATTERY, AND A METHOD ASSOCIATED WITH SAID CIRCUIT

The present invention relates to a portable electronic apparatus (cellphones, laptops, or the like) powered by means of a battery.

BACKGROUND OF THE INVENTION

When such a battery is rechargeable, it is known that the battery must be prevented from discharging whenever its internal voltage drops below a certain threshold, otherwise the battery is damaged and the number of discharge/recharge cycles is reduced compared with the number initially possible. For that purpose, certain battery manufacturers have made provision to equip each of their batteries with a battery discharge control circuit that compares the output voltage of the battery with a threshold, and that disconnects the battery from the equipment whenever said threshold is crossed. The value of the threshold can be set permanently. In which case, the battery is properly protected, but battery use is not optimized. By way of example, when the electronic apparatus is a cellphone, the current output by the battery powering the cellphone is greater when the telephone is in call mode than when it is standby mode. In which case, the battery output voltage that is used in the comparison with the threshold is not in any way a correct reflection of the internal voltage of the battery, and the battery is disconnected from the cellphone too soon.

In order to protect the battery as it discharges while also optimizing use of the battery, it has been proposed to make provision for the discharge control circuit to include means for estimating the voltage drop due to the internal impedance of the battery on the basis of a measurement of the current output by the battery, and means for adapting the threshold below which the battery should be disconnected, the adaptation being a function of the measured output current of the battery. A control circuit operating on that principle is described in Document U.S. Pat. No. 5,705,913, for example.

The drawback with that above-described control circuit lies in the fact that it is installed inside the battery, which increases the cost of the battery. Naturally, that cost is passed on to the user each time the user has to buy a new battery. Furthermore, the addition of a control circuit in the battery is in contradiction with the constant search for improved battery compactness. Finally, if the user installs a rechargeable battery, and there is no discharge control circuitry in the portable apparatus, then it is not possible to protect the battery.

OBJECTS AND SUMMARY OF THE INVENTION

An object of the present invention is to propose an electronic apparatus that is suitable for operating with various types of batteries and for managing battery discharge control independently.

This object is achieved by means of portable electronic apparatus suitable for being electrically powered by various types of batteries, said apparatus including means for identifying the type of the battery that is connected to it, and a discharge control circuit for controlling discharging of said battery, which circuit comprises:

comparator means for comparing the output voltage of the battery with a minimum threshold;

current-determining means for determining a value representative of the output current of the battery;

adapter means for adapting said minimum threshold as a function of the identified battery type and of the value representative of the output current; and stop means for stopping the electronic apparatus from being powered when the output voltage of the battery becomes lower than the minimum threshold delivered by the adaptor means.

The present invention also provides a method of controlling discharging of a battery powering portable electronic apparatus, the method being of the type consisting in stopping the portable electronic apparatus from being powered by the battery whenever the output voltage of the battery becomes lower than a predetermined minimum threshold, said method consisting in performing the following steps in said portable electronic apparatus:

identifying the type of said battery;

determining a value representative of the output current of the battery;

adapting said minimum threshold as a function of the battery type and of the value representative of the output current of the battery;

comparing the output voltage of the battery with said minimum threshold;

performing the preceding steps so long as the output voltage is greater than said minimum threshold; and stopping the portable electronic apparatus from being powered by the battery when the output voltage of the battery becomes lower than said minimum threshold.

It is already known that a portable electronic apparatus of the cellphone type can be provided with identification means for identifying the battery to which it is connected. However, such battery type identification has hitherto been used only for the purpose of determining whether or not the battery is rechargeable, or, when the battery is rechargeable, for the purpose of choosing the most suitable charging algorithm. When a non-rechargeable battery is used, it is essential, for safety reasons, to prevent any possibility of recharging the battery. Furthermore, various types of rechargeable battery exist, which types differ in size and in technology. Each type of rechargeable battery requires a charging algorithm that is specific to it. By way of example, if a lithium battery is recharged using a recharging algorithm that is normally used to recharge a nickel battery, then the battery might explode. It is therefore necessary to adapt the battery-recharging algorithm to the type of battery that is actually being used.

In a different manner, the present invention proposes to use the identification of the type of battery actually in use to control discharging of the battery, and to do so in the electronic apparatus.

BRIEF DESCRIPTION OF THE DRAWINGS

The invention, and the advantages procured by it will be better understood on reading the following description given with reference to the accompanying figures, in which:

FIG. 1 is a simplified diagram summarizing the various means of the invention implemented in portable electronic apparatus connected to a battery;

FIG. 2 shows a first possible embodiment of the adaptor means 13 shown in FIG. 1; and FIG. 3 shows a variant embodiment of the adaptor means 13 shown in FIG. 1.

DETAILED DESCRIPTION OF THE PREFERRED EMBODIMENTS

As shown in FIG. 1, a portable electronic apparatus 1, e.g. a cellphone, is connected electrically to a battery 2 represented diagrammatically by a voltage source 20 connected electrically in series with a resistor 21 representing the internal resistance of the battery. The output voltage and the output current of the battery 2 are designated below respectively by $U_S$ and by $I_S$. In a conventional manner, the battery also includes identification means 22 delivering information to the electronic apparatus 1 enabling said apparatus to determine the type of battery to which it is connected. In order to simplify the figure, the links between the identification means 22 and the set constituted by the voltage source 20 and by the resistor 21 are not shown. For example, reference may be made to Document EP 0 394 074 which describes various possible means for identifying battery type. The electronic apparatus 1 also includes identification means 10 for identifying the type of battery connected to it, which means receive the information from the battery, and determine the battery type. In a first possible embodiment, the battery type is identified by measuring the resistance of a specific resistor (not shown) contained in the identification means 22 of the battery and directly related to battery type. In which case, the identification means 10 comprise means for measuring the specific resistance, and a table stored in the electronic apparatus 1 making it possible to read off the type associated with the measured resistance of the specific resistor. In a variant, certain commercially-available batteries include a memory of the Electrically-Erasable Programmable Read-Only Memory (EEPROM) type constituting the identification means 22, which memory is connected via a serial bus to a control member of the microprocessor type in the electronic apparatus, and delivers information relating to the type of the battery directly.

According to a first characteristic of the invention, the battery type output by the identification means 10 is used in the control process for controlling discharging of said battery, as is explained below.

The electronic apparatus 1 further includes a battery discharge control circuit comprising:

comparator means 11 for comparing the output voltage $U_S$ of the battery with a minimum threshold S;

current-determining means 12 for determining a value representative of the output current $I_S$ of the battery;

adapter means 13 for adapting said minimum threshold S as a function of the identified battery type and of the value representative of the output current $I_S$; and stop means 14 for stopping the electronic apparatus 1 from being powered when the output voltage $U_S$ of the battery becomes lower than the minimum threshold S delivered by the adapter means.

A description follows of various possible embodiments of the various above-mentioned means:

A value representative of the output current $I_S$ of the battery may be determined either by measuring said current, or by estimating it using software. When said value is measured, the means 12 comprise a shunt resistor connected in series with the output of the battery, the input and output connections of the shunt resistor being connected to respective ones of the two input terminals of a differential amplifier. The output of the differential amplifier then delivers an analog measurement of the current $I_S$. When the current $I_S$ is estimated using software, the means 12 comprise a table storing the consumption of each element making up the electronic apparatus 1 and for each operating mode (e.g. in standby mode and in call mode for a cellphone). As a function of the present operating mode, the microprocessor-type control member of the apparatus 1 runs a program which estimates the consumed power $P_C$ in the present operating mode by summing the consumption of all of the elements activated in that mode. The estimate $\hat{I}_S$ of the output current is then given by the following relationship:

$\hat{I}_S = P_C/U_S$

This relationship, which takes account of the output voltage $U_S$ of the battery, is satisfied only when a chopper power supply is used. When the power supply is linear, it is necessary merely to estimate the output current $I_S$ as a function of the consumed power $P_C$ in the present operating mode of the electronic apparatus.

The threshold S must be adapted in a manner such that its value satisfies the following relationship:

$S = V_{INT}(R_{INT} \times I_S)$ where:

$V_{INT}$ represents the minimum internal voltage of the battery across the terminals of the voltage source 20, below which voltage the battery must not continue to be discharged;

$R_{INT}$ represents the internal resistance 21 of the battery;

$I_S$ represents the value of the output current either as measured or as estimated, this value being delivered by the current-determining means 12.

In a first possible embodiment, and as shown in FIG. 2, the adapter means 13 for adapting the threshold S include the microprocessor-type control member 130 of the electronic apparatus 1, which control member receives the battery-type information delivered by the identification means 10, and the measurement or the estimate of the output current $I_S$ of the battery as delivered by the means 12. The adapter means 13 also include a first table 131 and a second table 132 containing respectively, for each possible battery type, the value $V_{INT}$ of the minimum internal voltage and the value $R_{INT}$ of the internal resistance of the battery, these two values being supplied by the battery manufacturers. As a function of the battery type delivered by the identification means 10, the microprocessor 130 seeks the values $V_{INT}$ and $R_{INT}$ in the two tables 131 and 132, and runs a program contained in a ROM 133 so as to compute the adapted minimum threshold using the relationship given above.

In a variant, in addition to receiving the battery type information delivered by the identification means 10, and the measurement or the estimate of the output current $I_S$ as delivered by the means 12, the adapter means 13 also receive the value of the voltage $U_S$ output by the battery. As shown in FIG. 3, the adapter means 13 include the control member 130 and a single table 131 containing the minimum internal voltage value $V_{INT}$, as supplied by the manufacturers, for each possible battery type. The value $R_{INT}$ of the internal resistance is estimated by means of a program in the ROM 133, which program determines, for each variation $\Delta I_S$ in the output current $I_S$, the corresponding variation $\Delta U_S$ in the output voltage $U_S$, and determines the internal resistance value on the basis of the relative variation in the output voltage and in the output current using the following relationship:

$R_{INT} = \Delta U_S / \Delta I_S$

The adapted threshold is then computed as in the embodiment shown FIG. 2.

The comparator means, reference 11 in FIG. 1 may be of various types:

In a first possible embodiment, they may be constituted by an analog comparator receiving, at one of its inputs, the analog value of the output voltage $U_S$ of the battery, and receiving, at its other input, the adapted minimum threshold S delivered by the means 13 and as converted into an analog value.

In a first variant, the analog comparator may be replaced by a programmable comparator receiving the analog value of the output voltage $U_S$ of the battery, and having a comparison threshold that is programmable as a function of the minimum threshold S.

In a second variant, the comparison is performed using software by comparing the digital values of the output voltage Us of the battery and of the minimum threshold.

In all three embodiments, the comparator means 11 deliver an interrupt signal to a module 14 whenever the output voltage $U_S$ drops below the minimum threshold S. The module 14 then stops the apparatus 1 from being powered by the battery 2. "Stopping" the power supply also involves reducing the consumption of the electronic apparatus 1 to a negligible value, in particular by stopping all of the clocks of the components of the apparatus.

It is easy to understand that other embodiments may be implemented without going beyond the ambit of the present invention.

In addition, although the various elements 10 to 14 have been described separately, certain components of the elements may advantageously be in common. In particular, a single microprocessor constituting the general control member of the electronic apparatus 1 suffices for managing the following features: identifying the battery type, estimating the current $I_S$, adapting the threshold S, and using software to compare the threshold S with the output voltage $U_S$ of the battery.

Furthermore, the mechanism for controlling discharging of the battery must be implemented only insofar as the identification means 10 for identifying the type of battery used have identified a rechargeable battery. When a non-rechargeable battery is used, it is necessary to continue to use the battery for as long a time as possible. The discharge control process as described above must be inhibited, or else the minimum threshold S must be set to a minimum voltage acceptable by the electronic apparatus, since it is no longer necessary to protect the battery against over-discharging.

What is claimed is:

1. A portable electronic apparatus suitable for being electrically powered by various types of batteries, said apparatus comprising:

means for identifying a type of battery that is connected to it, and a discharge control circuit which controls discharging of the battery, which circuit comprises:

comparator means for comparing an output voltage of the battery with a minimum threshold voltage;

current-determining means for determining a value representative of an output current of the battery;

adapter means for adapting said minimum threshold voltage as a function of an identified battery type and of a value representative of the output current; and stop means for stopping the electronic apparatus from being powered when the output voltage of the battery becomes lower than the minimum threshold voltage delivered by the adapter means.

2. The portable electronic apparatus according to claim 1, wherein, with each battery type having a predetermined minimum internal voltage and a predetermined internal resistance, the adapter means comprises:

first means for determining the minimum internal voltage and the internal resistance of the battery as a function of the identified battery type, and second means for determining the adapted minimum threshold voltage as a function of the output current, of the minimum internal voltage, and of the internal resistance.

3. The portable electronic apparatus according to claim 2, wherein said first means comprises a first table in which the minimum internal voltage of the battery is stored for each possible battery type, and a second table in which the internal resistance of the battery is stored for each possible battery type.

4. The portable electronic apparatus according to claim 2, wherein said first means comprises:

a first table in which the minimum internal voltage of the battery is stored for each possible battery type, and means for estimating the internal resistance of the battery on a basis of a measurement of a relative variation between the output voltage of the battery and the output current.

5. A method of controlling discharging of a battery powering portable electronic apparatus, the method including stopping the portable electronic apparatus from being powered by a battery whenever an output voltage of the battery becomes lower than a predetermined minimum threshold voltage, said method comprising the following steps:

identifying the type of the battery;

determining a value representative of an output current of the battery;

adapting said minimum threshold voltage as a function of the battery type and of a value representative of the output current of the battery;

comparing the output voltage of the battery with said minimum threshold voltage;

performing the preceding steps so long as the output voltage is greater than said minimum threshold voltage; and stopping the portable electronic apparatus from being powered by the battery when the output voltage of the battery becomes lower than said minimum threshold voltage.

6. The control method according to claim 5, wherein the step of determining the value is performed by measuring the output current.

7. The control method according to claim 5, wherein the step of determining the value is performed by computing the output current deduced on a basis of consumed power that is consumed by a present operating mode of the portable electronic apparatus.

8. The control method according to claim 7, wherein the value representative of the output current is a function in particular of the output voltage of the battery.

9. The control method according to claim 5, wherein the minimum threshold voltage is adapted in particular as a function of the output voltage of the battery.

* * * * *